July 12, 1955
P. P. WUERTZ
2,712,787
PACKER OR FEEDER HEAD FOR BALERS
Filed Aug. 1, 1951
3 Sheets-Sheet 1
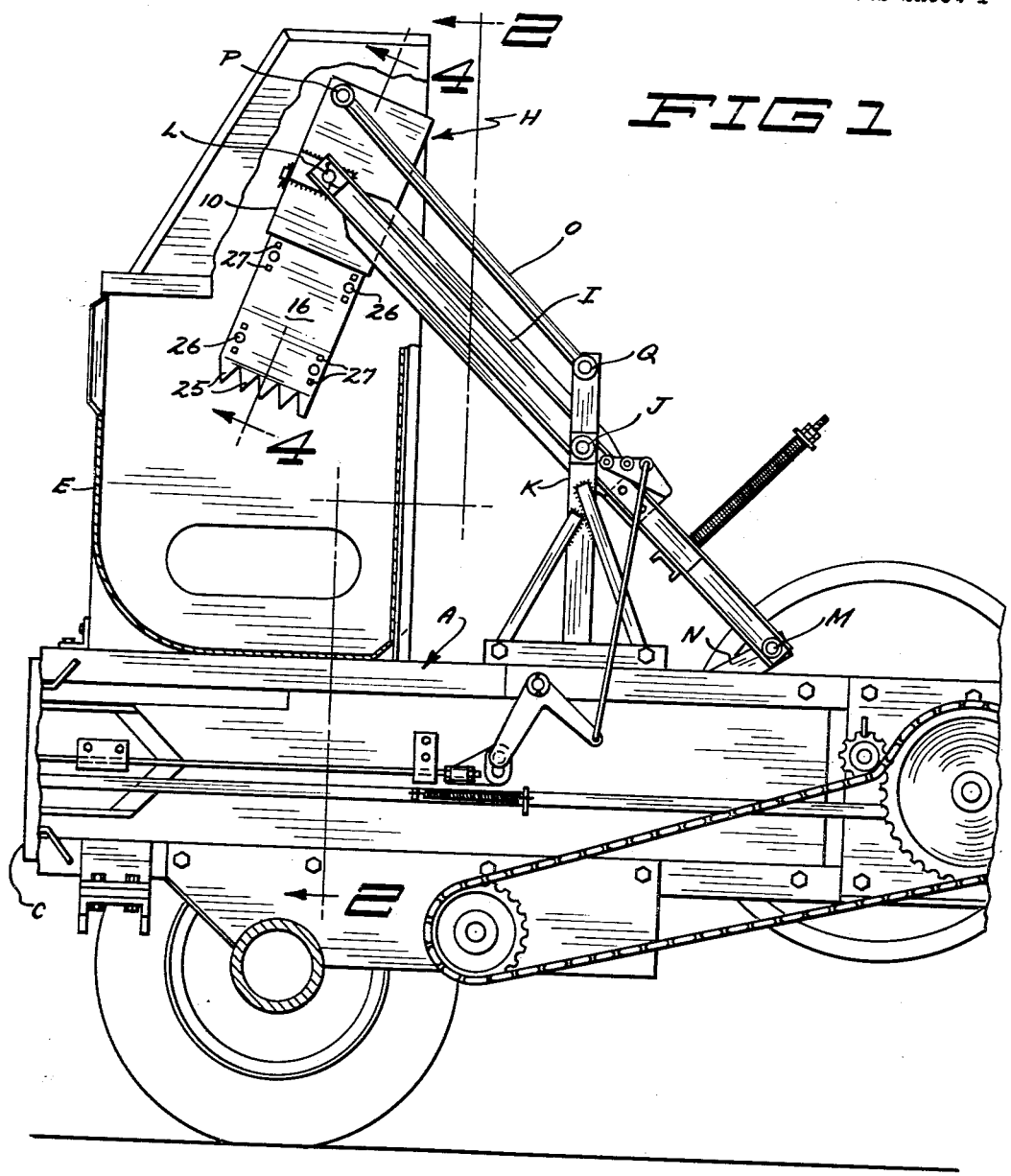
INVENTOR.
PAUL P. WUERTZ
BY
Carlsen + Hayle
ATTORNEYS July 12, 1955 P. P. WUERTZ 2,712,787
PACKER OR FEEDER HEAD FOR BALERS
Filed Aug. 1, 1951 3 Sheets-Sheet 2
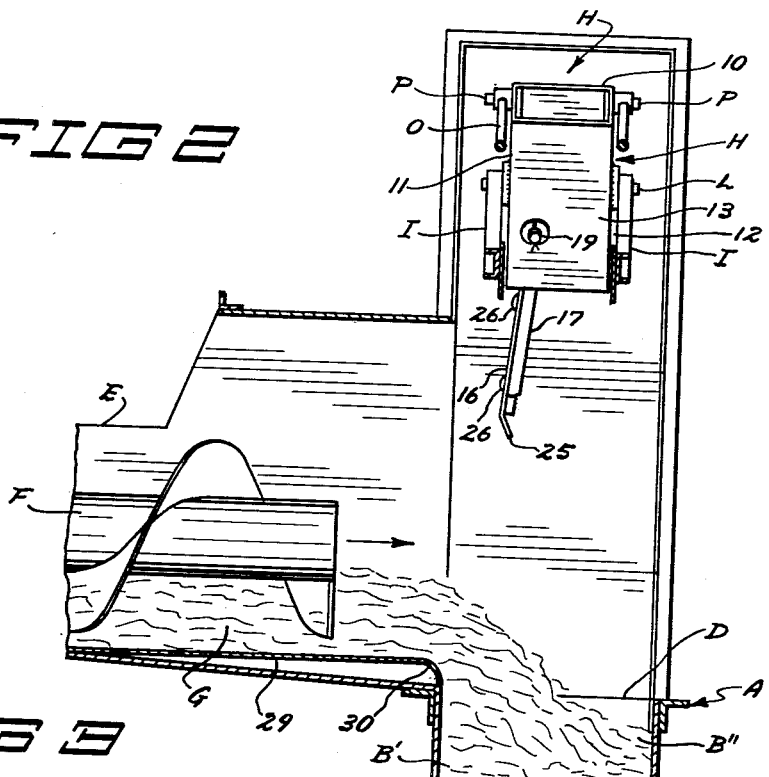
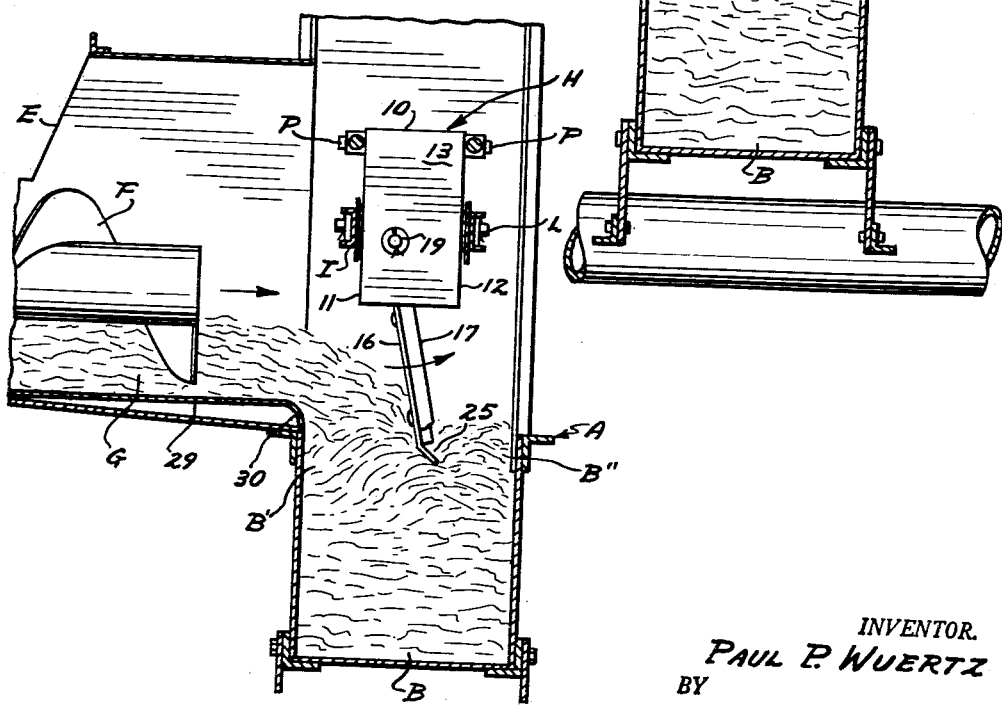
INVENTOR.
PAUL P. WUERTZ
BY
Carlsen & Hoyle
ATTORNEYS July 12, 1955  P. P. WUERTZ  2,712,787
PACKER OR FEEDER HEAD FOR BALERS
Filed Aug. 1, 1951  3 Sheets—Sheet 3
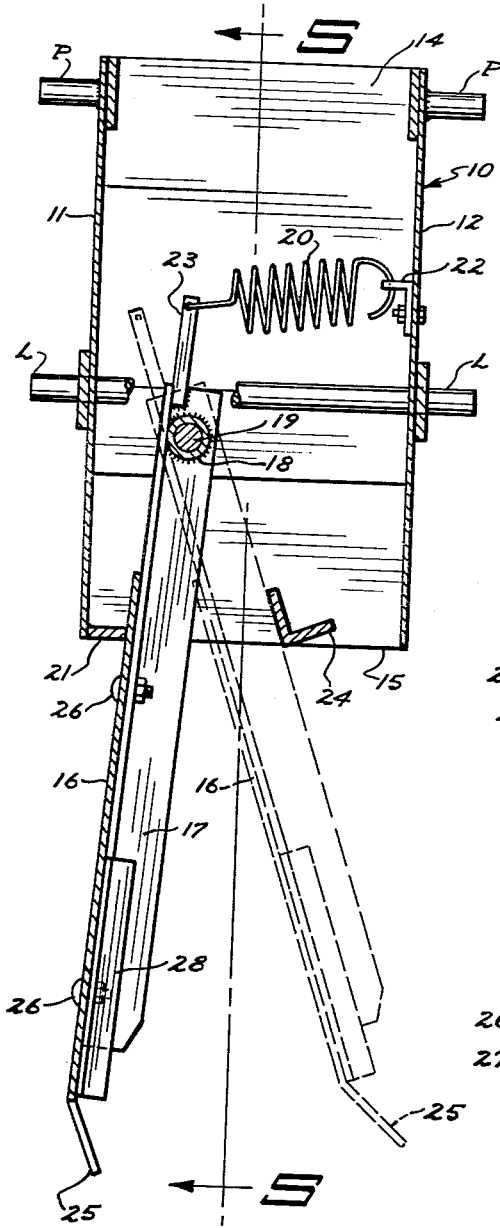
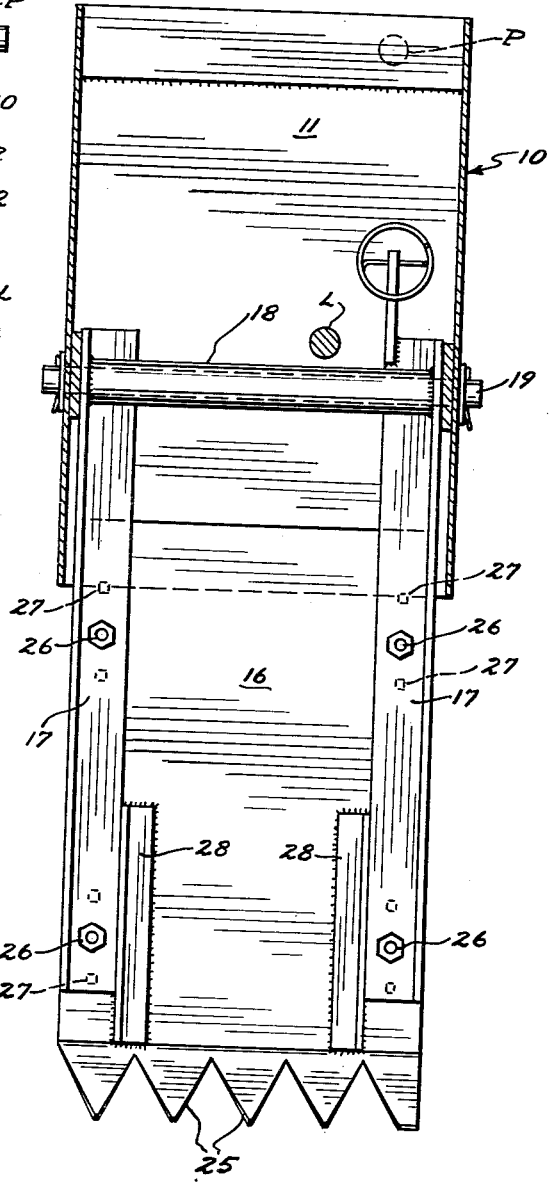
INVENTOR.
PAUL P. WUERTZ
BY
Carlsen + Hagle
ATTORNEYS

United States Patent Office 2,712,787
Patented July 12, 1955

2,712,787
PACKER OR FEEDER HEAD FOR BALERS

Paul P. Wuertz, Melrose, Minn., assignor to Minneapolis-Moline Company, Hopkins, Minn., a corporation of Minnesota Application August 1, 1951, Serial No. 239,692

3 Claims. (Cl. 100—142)

This invention relates to improvements in feed mechanisms for hay and straw balers, and more particularly to an improved packer or feeder head by which the material to be baled is fed into the baling chamber.

In the modern baling machine, such as exemplified in Patent No. 2,548,559, the material is baled in a chamber by a reciprocating plunger, and after a bale of a desired length is accumulated and compressed, it is automatically tied and discharged from the baler. The baling chamber has an opening in its upper side down through which the material to be baled is thrust by an upwardly and downwardly oscillating packer or feeder head, the operation of which is synchronized with the reciprocation of the baling plunger, so that this packer head will thrust a quantity of material down into the chamber in advance of each plunger stroke. The machine further includes a laterally or transversely extending housing, from which there forwardly projects a mechanism for picking up hay or straw from the field, and including a conveyor by which this material is elevated into the housing. Operating in this housing is a spiral feed auger by which the material is moved along the housing continuously toward the feed opening into the baling chamber, so that the material will be periodically thrust through this opening by action of the packer head.

It is, of course, desirable that the hay or other material be properly distributed in the baling chamber, so that all portions of the bale will be compressed to an equal amount and the bales will come out evenly and properly shaped. This is difficult to accomplish, however, under widely differing crop conditions and the problem is complicated by the fact the material coming off of the discharge end of the feed auger has a tendency to collect against the side of the packer head as it moves downward toward the baling chamber, so that as the packer head approaches the feed opening it cuts off the travel of the material. In fact the larger bulk of material is thrust down to the baling chamber at the side adjacent the delivery end of the feed auger and a minimum of material is distributed to the opposite side of the bale. As a result, the bales have a tendency to be compressed more firmly on one side than the other, and under aggravated conditions the finished bales will assume a curved shape, as the more firmly compressed sides tend to expand after being tied. It is accordingly the primary object of my invention to provide an improved packer or feeder head which includes a lower, swingable portion which may swing in the direction the crop material is moved off the delivery end of the auger, so that the tendency to restrict the material to one side of the baling chamber will be greatly diminished, while the swinging motion of this lower portion of the packer head will allow it to roll and thrust a greater proportion of the material to the side of the chamber remote from the auger, the end result being that the material is more evenly distributed over the full width of the baling chamber.

Another object of my invention is to provide an improved packer or feeder head construction having an upper box-like portion connected to its actuating arm and having a pivot whereon is suspended a lower, panel-like or plate portion which projects downward between stops in the upper portion of the device. A spring is then connected to this swinging plate, as it will be hereinafter called, and normally holds the plate over against one stop, but this spring is so arranged that as the packer head moves downward and comes in contact with the material moving off the delivery end of the auger, the thrust of this material will swing the plate, crosswise with respect to the baling chamber, until it finally comes to rest against the other stop, in which position the plate will tend to thrust the material toward the side of the baling chamber remote from the auger. The pivot for this swinging plate is so located that after the plate begins its swinging motion under the thrust of the material, the plate quickly moves past a straight vertical position and as the plate continues in downward contact with the material being thrust through the feed opening, the tendency will be for the plate to swing further toward its opposite stop, in order to permit material to be properly discharged into the chamber. In accordance with this object of my invention the swinging plate is further provided for adjustment vertically, or as to length, and the lower edge of the plate is toothed or serrated so as to properly engage the hay or other material being baled. Also to facilitate the proper feed of the material, the lower portion of the housing containing the feed auger is provided with a crop material support plate beneath the open discharge end of the auger, with the extremity of this plate rounded smoothly down to meet the adjacent edge of the feed opening, over which the packer or feeder head drags the material into the chamber.

These and other more detailed and specific objects will be disclosed in the course of the following specification, reference being had to the accompanying drawings, in which—

Fig. 1 is a side elevation of the central portion of a baling machine such as disclosed in the patent previously identified, with the feed auger housing shown in section and illustrating a packer or feeder head according to my present invention.

Fig. 2 is a somewhat diagrammatic vertical sectional view, taken substantially along the line 2—2 in Fig. 1, with the packer head in its elevated position.

Fig. 3 is a similar view but illustrating the action of the packer or feeder head as it moves downward toward the feed opening and thrusts the hay into the baling chamber.

Fig. 4 is an enlarged sectional detail view of the packer head alone, taken along the line 4—4 in Fig. 1.

Fig. 5 is another sectional view taken along the line 5—5 in Fig. 4.

Referring now more particularly and by reference characters to the drawing, the baling machine as partially shown therein comprises a main frame A having a baling chamber B in which there operates a plunger C, which is reciprocated in the chamber by a pitman connection, not here shown but clearly appearing in Patent No. 2,548,559. The baling chamber B has a feed opening D in its upper side and in alignment therewith there laterally projects a feed housing E in which operates an open ended spiral conveyor or feed auger F, so that crop material, indicated at G, fed into this housing E, will be moved laterally therein toward and over the feed opening D. It will be clearly understood in Fig. 2 that the larger part of the crop material G, delivered off the end of the auger F, will tend to fall into the adjacent side B′ of the baling chamber B, and thus the opposite side and particularly the upper corner portion B″ will receive less of the material, and a bale formed under these conditions will have a loose side, or corner portion. Not only does this waste operating time, since the value of the bales depends on their even density and weight, but bales formed under these conditions will have a tendency after they are tied to assume a curved condition as the more tightly compressed portions expand, and it will be difficult to handle and stack the bales.

In this type of baler, and all analogous types, the material being baled is periodically thrust in folds down into the baling chamber B by means of a vertically oscillating packer or feeder head, here designated generally at H, and this head is operated by a swinging arm structure I which is fulcrumed at J on a bracket or tower K, secured atop the frame A, and which at one end is pivoted at L to opposite sides of the packer head. At the other end the arm structure I is connected at M to a lug N which is attached to the pitman operating the plunger C, so that each time the baling plunger moves on its return stroke past the feed opening D, the resulting movement of the pitman will swing the arm structure I about its fulcrum J and move the packer head H downward toward said feed opening, and then as the plunger moves rearward on its working stroke the packer head will again be elevated. The packer head H is further held at the proper angle as it approaches the feed opening D by links O, pivoted at P and Q at opposite sides of the packer head, and the bracket K, and which act together with the arm structure I as a parallel-motion linkage for the packer head. In the machine of the previous patent the packer head H is in the form of an open, box-like device toothed at its lower edge to engage and drag the crop material G out of the delivery end of the housing E and thrust the material down through the feed opening and into the baling chamber B. Difficulty has been experienced, however, due to the fact that this type of packer head, as it approaches the feed opening D, forms in effect a solid wall to block the continuous delivery of the crop material out of the housing E by the auger F, and furthermore this type of packer head tends to thrust the crop material straight downwardly into the baling chamber so that the side B' thereof, nearest the delivery end of the auger, receives the larger proportion of the crop material as previously described.

In accordance with my invention the packer head H comprises an upper, rectangular, box-like section 10 made up of heavy sheet metal and with opposite sides 11 and 12 joined by front and rear walls 13 and 14. The upper and lower ends of this structure are open and the sides 11 and 12 carry laterally projecting studs which act as the aforesaid pivot connections L and Q for attaching this section of the packer head to the arm and link mechanism by which it is oscillated. Projecting from the open lower end 15 of this box-like upper section 10 is a lower swingable section in the form of a plate 16 which is attached at its margins to side members or angles 17 which are firmly united by a tubular bearing 18 which swings upon a pin 19. The pin 19 is journaled through the front and rear ends 13 and 14 of the upper section 10, adjacent the side 11 which faces the open or delivery end of the housing E, and the plate 16 is biased by means of a retractile coil spring 20, in order to angle downward and toward the open end of housing E when the packer head is in its elevated position. A stop bar 21 secured across the lower end of the packer head section 10 stops the plate 16 in this position, and the spring 20 is stretched between a bracket 22 secured within the side 12 and a finger 23 extending upward from one of the angles 17 in order to yieldably pull the plate over against this stop 21. The open lower end of the section 10 is also provided with another stop in the form of an angle 24, welded in place and spaced from the stop 21 to limit swinging motion of the plate 16 against the influence of the spring 20, as will presently appear.

The lower edge of the plate 16 is toothed or serrated, as indicated at 25, to obtain a grip on the crop material G, and since it is desirable at times to increase the overall vertical length of the packer head H, the plate 16 is adjustably mounted upon the angle 17 by means of bolts 26, with the plate itself provided with a series of vertically spaced openings 27 for the selective accommodation of these bolts in order to adjust the vertical position of the plate in several steps. For stiffening purposes and to insure the proper alignment of the plate 16 at all times, guide angles 28 are welded vertically just above the toothed lower edge 25 and slidably engage the adjacent inner edges of the angles 17, as seen in Fig. 5.

It will be noted that the teeth 25 are bent slightly with reference to the remainder of the plate 16, and in the direction in which the plate swings so that they will obtain a good purchase on the material being baled, as will be evident in Fig. 3.

The action of my improved packer head is facilitated and enhanced by the provision beneath the delivery end of the auger F of a plate 29, over the bottom of housing E which slopes downward at this point as seen in Figs. 2 and 3. This plate holds the crop material up into the auger flights and in addition the plate, being curved smoothly at 30 down to the adjacent margin of the feed opening D allows the material to be moved down into the bale chamber without hindrance, as will be clearly apparent.

In operation, as the packer or feeder head descends from its elevated position of Fig. 2 on its working stroke, the plate 16 will engage the hay moving off the discharge end of the auger F and thrust the hay downward into the baling chamber B. The pressure exerted by the hay being delivered by the auger will, however, swing the plate 16 from its normal position of Fig. 2 toward the stop 24, as indicated in Fig. 3, and thus the plate will be angled toward the side of the bale chamber remote from the auger to divert a larger share of the hay toward this side and ensure the even distribution of the hay throughout the bale. The pivot 19 for the plate 16 is located near the side of the packer head closest to the auger so that the plate quickly swings past the straight vertical position and thus as the packer head continues to descend the down pressure on the plate also tends to swing it toward stop 24. It will be noted in Fig. 3 that the angle of the teeth 25 is such that they will grip and roll the hay into the side B" of the bale chamber to maximum effect. As the packer head rises the spring 20, of course, returns the plate to its normal position of Fig. 2 ready for the next operation. This swingably suspended plate 16 thus overcomes the tendency of the usual packer head to block the flow of hay off the feed auger. Experience has proven that the hay delivery to the bale chamber is so increased in efficiency that the bales may be made in less time, and with all of the bales of even density throughout.

It will, of course, be understood that the swingable plate 16 will allow crop material to move over the feed opening without obstruction on the up stroke of the packer head also, the plate swinging under influence of the crop pressure until the head rises high enough to entirely clear the crop.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a crop material baler having a baling chamber and a reciprocating baling plunger therein, said chamber having a feed opening in its upper side, a housing extending laterally from the feed opening and a crop conveyor in said housing having a delivery end adjacent one edge of the feed opening and operative to feed crop material toward and over the opening, the improvement which comprises a packer head for moving crop material down through said feed opening into the baling chamber, operating means for moving the packer head up and down with respect to the feed opening, the said packer head having an upper section attached to said operating means and a lower plate-like section hinged at its upper end to the upper section adjacent the side from which the housing projects and for swinging movement in the direction in which crop material comes off the delivery end of the crop conveyor.

2. In a crop material baler having a baling chamber and a reciprocating baling plunger therein, said chamber having a feed opening in its upper side, a housing extending laterally from the feed opening and a crop conveyor in said housing having a delivery end adjacent one edge of the feed opening and operative to feed crop material toward and over the opening, the improvement which comprises a packer head for moving crop material down through said feed opening into the baling chamber, operating means for moving the packer head up and down with respect to the feed opening, the said packer head having an upper section attached to said operating means and a lower plate-like section hinged at its upper end to the upper section and hanging downwardly therefrom adjacent the side from which the housing projects and for swinging movement in the direction in which crop material comes off the delivery end of the crop conveyor, and spring means yieldably resisting movement of the lower section by the crop material.

3. In a crop material baler including a baling chamber having a feed opening in its top and mechanism for feeding crop material horizontally over the feed opening from one side of the baling chamber, a packer head and means for moving the same upwardly and downwardly to force the crop material downwardly through the feed opening, and a hanging and pivotally suspended crop engaging element carried by the packer head and swingable as the packer head descends by the crop material in a direction crosswise of the baling chamber and toward the side of the chamber opposite that from which the crop material is fed over the feed opening.

References Cited in the file of this patent

UNITED STATES PATENTS

| | | |
|---|---|---|
| 455,731 | Bates | July 14, 1891 |
| 1,028,404 | Trabue | June 4, 1912 |
| 2,387,535 | Sewell | Oct. 23, 1945 |
| 2,409,478 | Dickow | Oct. 15, 1946 |
| 2,464,684 | Hill | Mar. 15, 1949 |
| 2,509,996 | Tallman | May 30, 1950 |
| 2,548,559 | Ronning et al. | Apr. 10, 1951 |